(12) United States Patent
Becker et al.

(10) Patent No.: US 8,267,800 B2
(45) Date of Patent: Sep. 18, 2012

(54) TORSIONALLY ELASTIC CLUTCH

(75) Inventors: Markus Becker, Dortmund (DE); Peter Frohs, Velbert (DE)

(73) Assignee: Voith Patent GmbH, Heidenheim (DE)

( * ) Notice: Subject to any disclaimer, the term of this patent is extended or adjusted under 35 U.S.C. 154(b) by 222 days.

(21) Appl. No.: 12/452,316

(22) PCT Filed: Jul. 11, 2008

(86) PCT No.: PCT/EP2008/005664
§ 371 (c)(1),
(2), (4) Date: Mar. 29, 2010

(87) PCT Pub. No.: WO2009/010237
PCT Pub. Date: Jan. 22, 2009

(65) Prior Publication Data
US 2010/0206685 A1    Aug. 19, 2010

(30) Foreign Application Priority Data
Jul. 16, 2007 (DE) .......................... 10 2007 033 336

(51) Int. Cl.
*F16D 3/76* (2006.01)
(52) U.S. Cl. ........................................... 464/92
(58) Field of Classification Search .......... 464/87, 464/89, 90, 92; 192/207
See application file for complete search history.

(56) References Cited

U.S. PATENT DOCUMENTS

| 4,389,204 | A | * | 6/1983 | Walter |
| 4,781,659 | A | * | 11/1988 | Gebhardt |
| 5,988,015 | A | * | 11/1999 | Riu ................................ 464/90 |
| 2006/0172832 | A1 | * | 8/2006 | Watanabe et al. |

FOREIGN PATENT DOCUMENTS

| DE | 1259150 | * | 1/1968 |
| DE | 1259150 | B1 | 1/1968 |
| DE | 3635702 | A1 | 5/1988 |
| DE | 3925678 | A1 | 2/1991 |
| DE | 4221417 | A1 | 1/1994 |
| DE | 4330966 | C2 | 2/1996 |
| EP | 952365 | * | 10/1999 |
| EP | 0952365 | A1 | 10/1999 |
| EP | 1382886 | * | 1/2004 |

* cited by examiner

*Primary Examiner* — Gregory Binda
*Assistant Examiner* — Josh Skroupa
(74) *Attorney, Agent, or Firm* — Farjami & Farjami LLP

(57) ABSTRACT

A torsionally elastic clutch is provided including a primary part and a secondary part connected to transfer torque, and including an elastic connecting member having a first attachment surface placed externally in the radial direction of the clutch, and a second attachment surface placed internally in the radial direction of the clutch, connected to transfer torque with the primary part and the other with the secondary part, the two attachment surfaces are displaced relative to each other in the axial direction of the clutch, and further including a tensioning device, which maintains the relative displacement of the two attachment surfaces. An axial bearing is provided between the primary part and the secondary part, which permits a relative twisting in the circumferential direction of the clutch between the primary part and the secondary part, and additionally the tensioning device applies a compressive stress to the axial bearing.

17 Claims, 2 Drawing Sheets

TORSIONALLY ELASTIC CLUTCH

Figure 1:
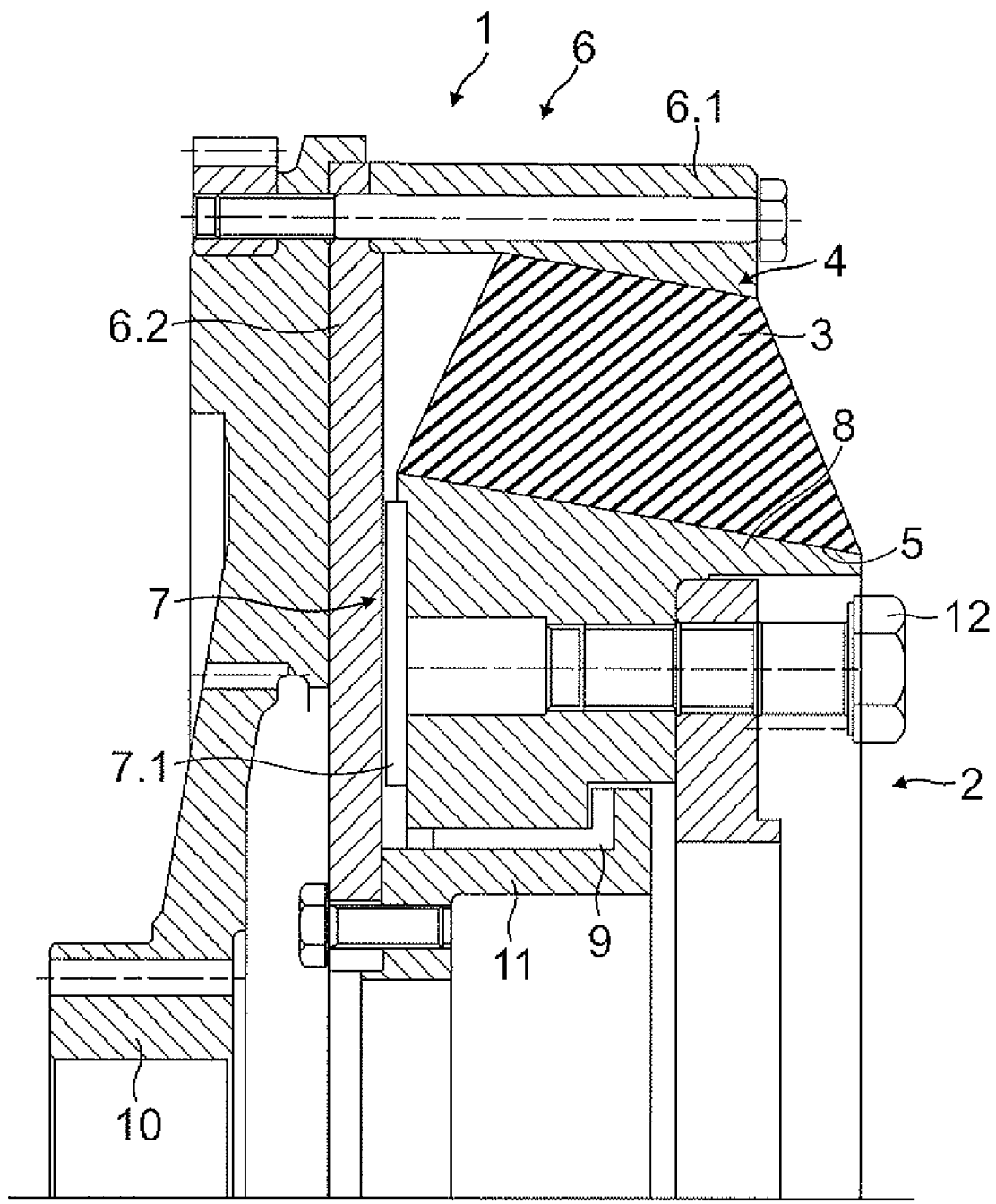

This is a U.S. national phase application which is based on, and claims priority from, PCT application Serial No. PCT/EP2008/005664, filed on Jul. 11, 2008, which claims priority from foreign application Serial No. DE 102007033336.8, filed on Jul. 16, 2007 in Germany.

The invention relates to a torsionally elastic clutch according to the preamble of claim 1.

Torsionally elastic clutches which are used in stationary and mobile facilities such as an automotive drive train, transfer torque or turning moments while simultaneously damping torsional vibrations. Traditionally such torsionally elastic clutches have been used in railway motive power, for example, in the drive train between the drive and the driven axle or the driving wheels.

Requirements for torque capacity of components in the drive train, both in mobile and stationary facilities, have been constantly increasing. The main reason for this is rapidly developing Diesel technology. Turbocharging and high-pressure injection systems have tripled the torque capacity of Diesel engines in recent years. The result of this is that ever higher torques are being generated by ever smaller Diesel engines, and these must be transferred by ever smaller components in the drive train. At the same time, the rotating weights of the engines are steadily reducing, so that the smaller engines are becoming more powerful generators of torsional vibration than their equally strong but larger predecessors.

The problem of heightened generation of torsional vibrations is exacerbated by the fact that for internal combustion engines, especially Diesel engines in all areas of application, ever more exacting legal emissions requirements are going into effect, which cannot be met solely by filter systems on the exhaust side. Therefore, additional measures must be taken that optimize the combustion process in the engine, which is leading, and increasingly will lead, to further increases in generation of torsional vibrations. By this means, the comparatively smaller components in the drive train are also subjected to still greater torsional vibrations than the traditionally comparatively larger components.

As a result of this development, even in compact drive trains in which no torsional vibration dampers have been required hitherto, increasingly highly elastic clutches are needed which reduce the vibrations in the drive train to a level that the other components can tolerate. These clutches must be suited to transfer comparatively larger torques with a smaller design size, and at the same time be able to make available a higher damping capacity for torsional oscillations as compared to traditional versions.

Traditionally in compact applications it is primarily elastic clutches that are used with so-called axially elastic connecting members. With such clutches, as are for example described in DE 39 25 678 C2, a first axial outer side of the elastic connecting member is connected with the driving part of the clutch, also called the primary part, and a second axial outer side which is placed opposite the first axial outer side, is connected with the driven part, also called the secondary part. A limited compressive stress is applied to the elastic connecting member, which simultaneously acts on an axial friction bearing to achieve frictional damping.

Additional elastic clutches with axial elastic connecting members are described in documents DE 36 35 702 C2, DE 42 21 417 C2 and DE 43 30 966 C2. One disadvantage of such clutches with an axially elastic connecting member that are used especially as connecting clutches, derives from limited torque capacity. The torque transferable with such clutches can be achieved only by enlarging the attachment surface of the elastic connecting members which runs in the radial direction. Owing to the limited structural space that often is available only for installation of the elastic clutch, and in particular does not permit the elastic clutch diameter to be expanded, the attachment surfaces of connecting members needed for high torque moments cannot be implemented.

For transferring greater torque moments, elastic clutches with so-called radial connecting members are suitable, as are described for example in document DE 1 259 150. Such elastic clutches, such as are related to the present invention, have a primary part and a secondary part that are connected with each other so as to transfer torque via a connecting member that is preloaded with compressive stress and loaded for torsion in the circumferential direction by the primary and secondary part, with the elastic connecting member connected with the primary part and the secondary part so as to transfer torque via attachment surfaces placed one behind the other or opposite each other in the radial direction. Also on such clutches with radial elastic connecting members, the connecting members are pre-tensioned, in that their two attachment surfaces are displaced relative to each other in the axial direction.

The described elastic or highly elastic clutches with a radial elastic connecting member are in fact characterized by high torque capacity, because they are designed with relatively large connecting surfaces of the elastic connecting members, because the connecting surfaces in the axial direction respectively essentially run in a radial direction, and structural space limitations on this axial direction in practice are not as severe as in the radial direction. However, their vibration damping properties are limited owing to the fact that the elastic connecting members, manufactured as a rule out of rubber, are the sole generators of the damping.

Catalog PNEUMAFLEX KA for highly elastic control clutches by Rexroth (Pneumaflex is a registered trademark), bearing number RDE 75 426 09.97, shows a control clutch with torsionally elastic connecting members switched in series to friction couplings that are designed as radial connecting members. The friction couplings serve to bridge over slip when switching the clutch on, i.e. they increasingly adapt the r.p.m.s of the two halves of the friction coupling.

It is not possible to dampen friction when the clutch is switched on, i.e., during operation of the clutch, due to the serial arrangement with the elastic connecting members.

The task that is the basis for the present invention is to provide a torsionally elastic, especially highly elastic clutch for use in relatively compact drive trains of mobile or stationary facilities, especially for motor vehicle drive trains, which has both a high torque capacity and also outstanding torsional-vibration-damping properties.

The problem according to the invention is solved by a torsionally elastic clutch with the features of claim 1. In the dependent claims, advantageous and especially appropriate embodiments of the invention are provided.

The invention-specific torsionally elastic clutch has a radial elastic connecting member, i.e. the elastic connecting member is connected so as to transfer torque with the primary part of the clutch via a first radial external attachment surface and with the secondary part of the clutch via a second radial internal attachment surface. The elastic connecting member can be attached directly onto the primary part or be attached (for example vulcanized) onto an element shape-locked and frictionally connected to the primary part. Additionally, the elastic connecting member with its second attachment surface can likewise be attached directly onto the secondary part or be attached (for example vulcanized) onto an element shape-locked or frictionally connected onto the secondary part.

To generate a compression pre-stressing in the elastic connecting member which results in extension of the service life of the elastic connecting member that is loaded by torque transfer and especially the vibrations when torque is transferred, the two attachment surfaces are displaced relative to each other in the axial direction of the clutch, as compared with a position of the two connecting surfaces in a state where the elastic connecting member is not pre-tensioned. The attachment surfaces are permanently pre-stressed by pressure or displaced relative to each other, and this is maintained by means of a tensioning device. If the pre-tensioning by pressure is permanently maintained by the tensioning device, this means that during operation of the torsionally elastic clutch, the tensioning device cannot be regulated to cancel the pre-tensioning by pressure or the relative displacement of the connecting surfaces of the elastic element in the axial direction. However, according to one embodiment form it is possible with this to vary the amount of the pre-tensioning by pressure or the extent of relative displacement during operation by means of the tensioning device or an additionally provided device. However, the tensioning device is especially designed so that the axial position of the two attachment surfaces is constant relative to each other during operation of the elastic coupling.

So that a pre-tensioning by pressure is generated in the elastic connecting member and a compression force is transferred between the primary part and the secondary part via the elastic connecting member, each attachment surface has at least one area that runs inclined relative to the axial direction and thus to the direction of displacement. As compared with a state of the elastic connecting member that is not pre-tensioned, the two areas of the attachment surfaces that run inclined in the pre-tensioned state of the elastic connecting members are to be displaced to each other. Thus the area transfers the compression force between the elastic connecting member and the primary part or the secondary part. According to one embodiment form, the first attachment surface and/or the second attachment surface can be overall inclined relative to the axial direction. With this, both planar attachment surfaces and arched or non-planar ones are conceivable. For example, then the attachment surface can have a section parallel as viewed in an axial section through the clutch to the axial direction, and a section running at an incline thereto, and especially be composed precisely of these two sections.

According to the invention, between the primary part and the secondary part, an axial bearing is provided, which permits relative twisting in the circumferential direction of the clutch between the primary part and the secondary part. Onto this axial bearing, by means of the tensioning device which maintains the relative displacement of the two attachment surfaces of the elastic connecting member, a compressive stress is applied, which acts as a normal force to a sliding friction force in the axial bearing, if sliding friction appears owing to the relative twisting between the primary part and the secondary part in the axial bearing or in the bearing surfaces placed opposite in the axial bearing. The axial bearing causes a sliding friction damping, with the damping being provided relative to the operating energy flux through the torsionally elastic coupling parallel to the torsionally elastic damping by means of the elastic connecting member.

Advantageously this is achieved in that the elastic connecting member or members and the axial bearing or bearings that dampen sliding friction are situated between the same component or components of the torsionally elastic clutch within which the individual components are connected to each other so as not to turn.

In especially advantageous fashion, the tensioning device applies the compressive stress via the elastic connecting member to the axial bearing. Correspondingly, the inclined surfaces can be designed as regards their direction of inclination, so that they cause compressive stress in the direction of the axial bearing.

The axial bearing is especially configured as a dry-operation or wet-operation friction bearing with two friction surfaces gliding on one another. For example, provision is made on one of the two components that move relative to each other in the circumferential direction of the clutch, forming the sliding surface, for a friction disk that for example can be configured as a circular ring and which runs over the outer contour of the torsionally elastic clutch. Additionally, a second corresponding friction disk can be provided on the opposite side. According to an alternative embodiment form it is possible to arrange a multiplicity of friction disks distributed over the outer contour on one or both of the components of the clutch that move relative to each other, that can be placed at intervals to each other or can adjoin one another. The advantage of such friction disks, if they are provided as detachable components, is that they can be replaced as parts subject to wear.

The tensioning device can be embodied as a detachable mechanical attachment, with it being especially configured so that when the clutch is not in operation, i.e., stopped, it can be detached. Naturally it is also possible as an alternative to provide the pre-tensioning by compression via a non-detachable connection between two components that act as a tensioning device, for example via a material-locking connection like welding, soldering or adhesive bonding. It is especially advantageous for the tensioning device to be produced by means of screw connection, riveting and/or pin connection, as is described farther on with reference to the figures according to an embodiment example.

The elastic connecting member can advantageously be attached to two rings, an inner ring and an outer ring, and especially be vulcanized on. The elastic element is then preloaded with compression by axially displacing the two rings relative to each other, naturally with the relative displacement created either by displacing only one of the rings, for example if it is securely screwed onto an additional component, or simultaneously displacing both rings. For example, the outer ring can be screwed onto a counter-element when pre-tensioned by compression, with the counter-element simultaneously exerting the required reaction force or counter force on the inner ring. The counter-element especially is the primary part of the clutch or a component that is attached in shape-locking or frictionally connected form to it. Depending on the definition, the outer ring can also be designated as the primary part or element of the primary part, i.e., the operating energy is applied via it to the elastic clutch.

Both the named outer ring and the named inner ring may, but do not have to, be configured as a complete ring, i.e. a ring enclosing the outer contour of the clutch. As an alternative, a multiplicity of ring segments arrayed at an interval to each other or attached to each other, can be considered.

Also the elastic connecting member, which especially is manufactured from rubber, can be configured as a complete ring, closed ring or in the form of a multiplicity of ring segments that are arrayed over the outer contour of the clutch. With this, any combinations between the inner ring as a complete ring or as ring segments, the outer ring as a complete ring or as ring segments, and the elastic connecting member as a complete ring or as ring segments, are conceivable.

Especially if it is designed as a rubber element, the elastic connecting member can be made either of a homogeneous material or as a composite material with sections having differing material properties. For example, a laminated embodiment form can be considered, with metallic sections or metallic rings being able to be provided between the individual rubber sections.

According to one embodiment form, the invention-specific elastic or highly elastic clutch is embodied as a clutch not capable of shifting, i.e., when it is situated in a drive train, torque is transmitted and torsional vibration is damped in all operational states via the elastic clutch.

In what follows, the invention is described using an embodiment example.

Figure 2:
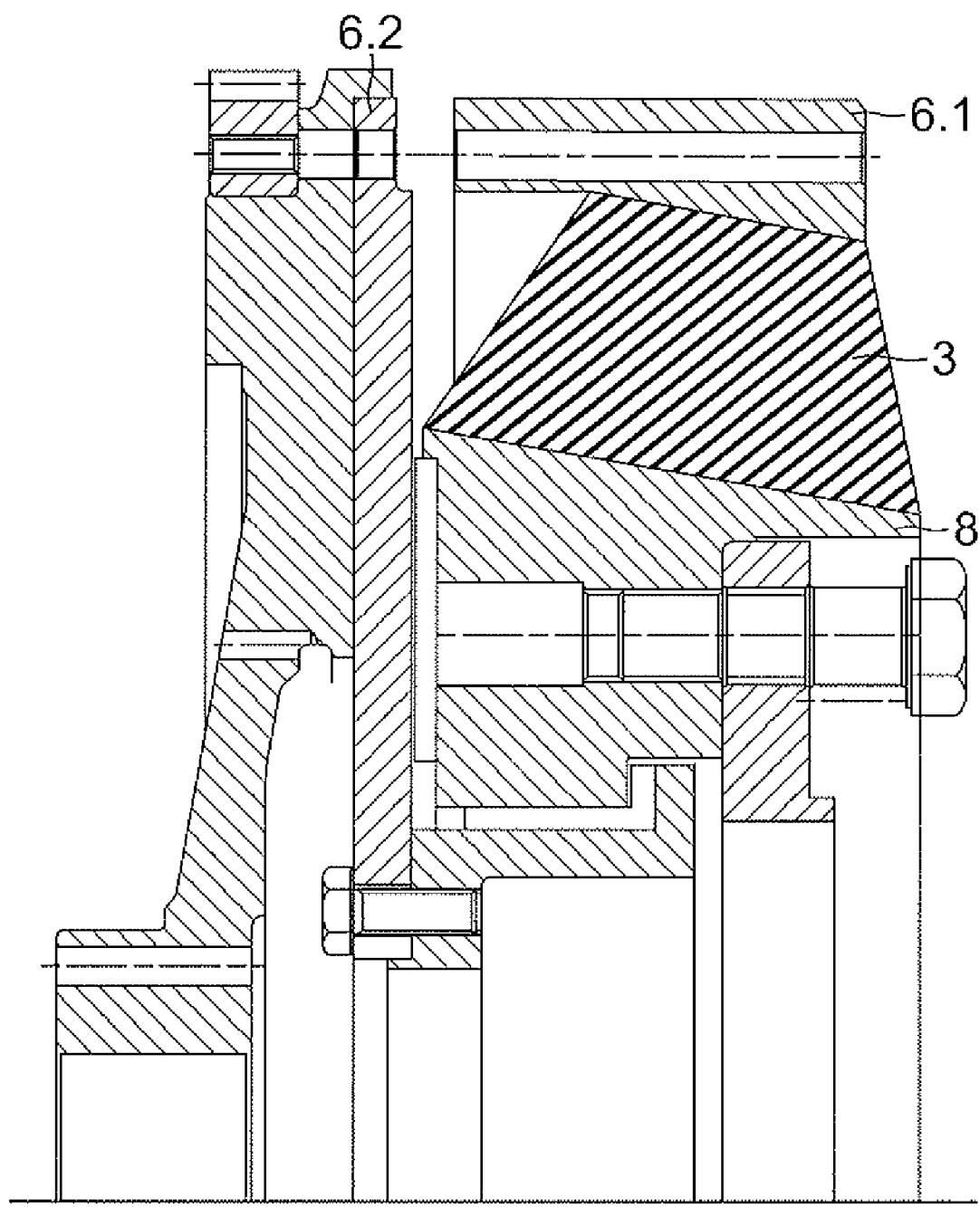

Shown are:

FIG. 1 a torsionally elastic clutch designed according to the invention in its mounted state;

FIG. 2 the elastic clutch from FIG. 1 in a mounted state, but still with no pre-loaded elastic connecting member.

According to FIG. 1, an elastic or torsionally elastic connecting member 3 is attached with its radially outer first attachment surface 4 onto primary part 1 and with its second attachment surface 5 that is situated to be radially inward, onto secondary part 2. In the present instance vulcanization is used for the attachment. The first attachment surface 4 is attached or vulcanized onto a first attachment ring 6.1, here designed as a one-piece exterior ring running over the entire outer contour of the clutch, and second attachment surface 5 is attached or vulcanized onto a second attachment ring 8, here designed as a one-piece interior ring running over the entire outer contour of the clutch.

First attachment ring 6.1 is screwed with a clutch entry via which operating energy or torque is transferred into the clutch. The clutch entry is presently formed by flywheel 10 of an internal combustion engine, especially a Diesel engine. Here, between first attachment ring 6.1 and the clutch entry or flywheel 10, an additional disk is situated as a counter-element 6.2 of tensioning device 6, comprising or consisting of first attachment ring 6.1, the pertinent screw connection and counter-element 6.2. By tightening the screws of the screw connection of tensioning device 6, first attachment ring 6.1 (the outer ring) is displaced against the compression force of elastic connecting member 3 in the direction toward counter-element 6.2 in the axial direction of the clutch, until it adjoins it. Between counter-element 6.2 and second attachment ring 8 (the inner ring) an axial bearing 7 is positioned, which here has a friction disk 7.1 that is attached, and especially screwed, on the second attachment ring 8. Thus, when the screw attachment of tensioning device 6 is tightened, counter-element 6.2 exerts a counter-force via axial bearing 7 on second attachment ring 8, which, in the screwed-on or pre-tensioned-by-compression state of the clutch, is maintained during operation and acts as a normal force when sliding friction appears in axial bearing 7, when first attachment ring 6.1 or the clutch entry attached to it and the counter-element 6.2 twist relative to second attachment ring 8 and thus to secondary part 2 of the clutch.

Depending on the definition, first attachment ring 6.1, the clutch entry or presently the flywheel 10 and/or counter-element 6.2 can be regarded as the primary part 1 of the clutch. The only decisive feature is that when the clutch is operational, a pre-tensioning by pressure is generated to elastic connecting member 3 via axial displacement or maintained displacement of primary part 1 or an element attached onto it, currently of first attachment ring 6.1, and at the same time axial bearing 7 between primary part 1 and secondary part 2 is impinged on by the same pre-tensioning by pressure, in order to attain a frictional damping or amplified frictional damping during operation in axial bearing 7.

The extent of the relative displacement of first attachment ring 6.1 vis-à-vis second attachment ring 8 when tightening the screw connection of tensioning device 6 is especially evident from a comparison of FIGS. 1 and 2 in both of which only one half is depicted via the axis of rotation of the clutch in an axial section.

The counter-element 6.2 shown in the figures as a separate component to the clutch entry or the flywheel 10 can also as an alternative be integrated into the clutch entry or flywheel 10 or first attachment ring 6.1, i.e. be designed as a single piece with it.

With the embodiment form shown, a supporting pin 11 mounted on primary part 1, is attached, here screwed, in the form of a closed ring, that could also be designed as a single piece with the clutch entry or counter-element 6.2, or also could be dispensed with to economize. Between supporting pin 11 and secondary part 2, here the second attachment ring 8, a radial bearing 9 is provided. With the embodiment form shown, radial bearing 9 also has a second axial bearing as a counter-bearing to first axial bearing 7. Thus a safety device against being lost is created. However, second axial bearing could also be dispensed with or be situated outside radial bearing 9.

On secondary piece 2 a clutch outlet, especially in the form of a shaft, can be installed so as to be removable or not, for example by means of the depicted screw connection 12. If both the primary part 1, here in the form of the clutch entry or flywheel 10, and the clutch outlet are removably attached on the components, onto which the elastic connecting member 3 is vulcanized and/or unremovably attached, then after being subjected to wear, elastic connecting member 3 along with the components attached thereon, here the first attachment ring 6.1 and second attachment ring 8, can be replaced by a corresponding "new" structural unit.

The elastic connecting member 3 can be manufactured, for example, from a polymeric material. Here in fact it has attachment surfaces 4, 5 placed concentric to the turning axis of the clutch. Viewed in an axial section through the clutch, however, these attachment surfaces 4, 5 are not situated parallel to the turning axis, which also would be possible, but rather aslant or at an acute angle thereto. The angle has been chosen so that if the elastic connecting member 3 is braced by means of tensioning device 6, the components onto which elastic connecting member is vulcanized, here first attachment ring 6.1 and second attachment ring 8, are pressed against elastic connecting member 3. By this means, shear stress at the interface between elastic connecting member 3 and the attached components is lessened, which acts against a rupture.

Additionally, with the embodiment form shown, the elastic connecting member 3 is configured as a trapezoid, with the first attachment surface 4, viewed in an axial section through the clutch, being shorter than second attachment surface 5. Owing to the fact that first attachment surface 4 lies at a larger diameter than second attachment surface 5, at the same time the overall surface of the first attachment surface can be designed to be equal to or larger than that of second attachment surface 5, if this is desired.

The invention claimed is:

1. A torsionally elastic clutch
with a primary part and a secondary part, which are connected with each other to transfer torque, with an elastic connecting member having a first attachment surface placed externally in the radial direction of the clutch, and a second attachment surface placed internally in the radial direction of the clutch, of which one is connected to transfer torque with the primary part and the other with the secondary part; and for generation of pre-stressing by compression, the two attachment surfaces are displaced relative to each other in the axial direction of the clutch vis-à-vis a non-pre-stressed state; with each attachment surface having at least one area that runs inclined relative to the axial direction, with the two inclined areas to be displaced toward each other vis-à-vis a non-pre-stressed state of the elastic connecting member, so that a compression force is transferred between the primary part, the secondary part and the elastic connecting member;

with a tensioning device, which maintains the relative displacement of the two attachment surfaces and thus the pre-stressing by compression;

characterized in that between the primary part and the secondary part an axial bearing is provided, which permits a relative twisting in the circumferential direction of the clutch between the primary part and the secondary part, and additionally the tensioning device applies a compressive stress to the axial bearing, which acts as the normal force to a sliding friction force in the axial bearing with relative twisting between the primary part and the secondary part.

2. The torsionally elastic clutch according to claim 1, characterized in that the tensioning device applies the compression loading via the elastic connecting member onto the axial bearing.

3. The torsionally elastic clutch according to claim 2, characterized in that the tensioning device is designed in the form of a detachable mechanical connection, especially a screw connection, riveting or pin connection.

4. The torsionally elastic clutch according to claim 3, characterized in that the tensioning device has a first attachment ring attached on the elastic connecting member, which is especially designed as a closed ring or with a multiplicity of ring segments situated at intervals from each other in the circumferential direction of the clutch, which first attachment ring is attached on one of the two attaching surfaces of the elastic connecting member and which is connected in material-locking or frictionally connected fashion against the elastic force of the elastic connecting member with a counter-element, and especially is screwed, so that a pre-stressing by compression is generated in the axial direction of the clutch in the elastic connecting member, and the counter-element, via the axial bearing and especially a second attachment ring, which is attached on the other attachment surface of the elastic connecting member, transmits a counter-force to the other attachment surface of the elastic connecting member.

5. The torsionally elastic clutch according to claim 4, characterized in that the first and/or the second attachment ring is or are designed as a closed ring or in the form of a multiplicity of ring segments situated in the circumferential direction of the clutch at an interval to each other.

6. The torsionally elastic clutch according to claim 1, characterized in that the tensioning device is designed in the form of a detachable mechanical connection, especially a screw connection, riveting or pin connection.

7. The torsionally elastic clutch according to claim 6, characterized in that the tensioning device has a first attachment ring attached on the elastic connecting member, which is especially designed as a closed ring or with a multiplicity of ring segments situated at intervals from each other in the circumferential direction of the clutch, which first attachment ring is attached on one of the two attaching surfaces of the elastic connecting member and which is connected in material-locking or frictionally connected fashion against the elastic force of the elastic connecting member with a counter-element, and especially is screwed, so that a pre-stressing by compression is generated in the axial direction of the clutch in the elastic connecting member, and the counter-element, via the axial bearing and especially a second attachment ring, which is attached on the other attachment surface of the elastic connecting member, transmits a counter-force to the other attachment surface of the elastic connecting member.

8. The torsionally elastic clutch according to claim 7, characterized in that the first and/or the second attachment ring is or are designed as a closed ring or in the form of a multiplicity of ring segments situated in the circumferential direction of the clutch at an interval to each other.

9. The torsionally elastic clutch according to claim 7, characterized in that the first attachment ring is designed as an exterior ring mechanically connected, especially screwed, to the primary part, which exterior ring is attached directly or indirectly to the first attachment surface.

10. The torsionally elastic clutch according to claim 1, characterized in that the elastic connecting member is designed as a rubber element, especially a rubber element that is made of one piece and/or is of homogeneous material.

11. The torsionally elastic clutch according to claim 1, characterized in that the axial bearing has a friction disk that is especially designed to run in annular fashion over the outer contour of the clutch, and is mounted on the primary part or secondary part and operates in conjunction with a friction surface or an additional friction surface on the other part.

12. The torsionally elastic clutch according to claim 11, characterized in that the friction disk and especially a second friction disk is attached as a replaceable wearing part on the clutch so as to be removable.

13. The torsionally elastic clutch according to claim 1, characterized in that the axial bearing is designed as a dry-operation or wet-operation friction bearing.

14. The torsionally elastic clutch according to claim 13, characterized in that the friction disk and especially a second friction disk is attached as a replaceable wearing part on the clutch so as to be removable.

15. The torsionally elastic clutch according to claim 1, characterized in that between the primary part and the secondary part a radial bearing is provided in addition to the axial bearing.

16. The torsionally elastic clutch according to claim 1, characterized in that the clutch is designed as a clutch that cannot be switched and is constantly transmitting torque.

17. The torsionally elastic clutch according to claim 1, characterized in that the first attachment surface and the second attachment surface are placed parallel to each other, and especially in an axial section through the clutch parallel to the turning axis of the clutch or placed at an acute angle deviating from 90° to it.

* * * * *